United States Patent
Chen et al.

(10) Patent No.: US 10,140,030 B2
(45) Date of Patent: Nov. 27, 2018

(54) DYNAMIC MODULATION OF CACHE MEMORY

(71) Applicant: International Business Machines Corporation, Armonk, NY (US)

(72) Inventors: Duo Chen, Shanghai (CN); Min Fang, Shanghai (CN); Guo Feng Zhu, ShangHai (CN)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 14/929,458

(22) Filed: Nov. 2, 2015

(65) Prior Publication Data
US 2017/0123688 A1    May 4, 2017

(51) Int. Cl.
*G03F 3/06* (2006.01)
*G06F 3/06* (2006.01)

(52) U.S. Cl.
CPC ............ *G06F 3/0611* (2013.01); *G06F 3/067* (2013.01); *G06F 3/0649* (2013.01)

(58) Field of Classification Search
CPC .. G06F 3/0613; G06F 12/0848; G06F 3/0685; G06F 3/0644; G06F 2212/282
See application file for complete search history.

(56) References Cited

U.S. PATENT DOCUMENTS

| | | | |
|---|---|---|---|
| 8,285,918 B2 | 10/2012 | Maheshwari | |
| 2012/0047339 A1* | 2/2012 | Decasper | G06F 11/1076 711/162 |
| 2013/0275653 A1* | 10/2013 | Ranade | G06F 3/0605 711/103 |
| 2015/0026416 A1 | 1/2015 | Nemazie et al. | |
| 2015/0067258 A1* | 3/2015 | Jung | G06F 12/0868 711/119 |
| 2016/0011816 A1* | 1/2016 | Aizman | G06F 3/0604 711/117 |
| 2016/0259565 A1* | 9/2016 | Hendry | G06F 12/121 |

OTHER PUBLICATIONS

Liu et al, "An Efficient Schema for Cloud Systems Based on SSD Cache Technology", Research Article, Hindawi Publishing Corporation, Mathematical Problems in Engineering, vol. 2013, Recevied Jul. 11, 2013, Accepted Sep. 7, 2013, Article ID 109781, 9 pages, <http://dx.doi.org/10.115/2013/109781>.
Zhang et al., "Adaptive Data Migration in Multi-tiered Storage Based Cloud Environment", 2010 IEEE 3rd International Conference on Cloud Computing, © 2010 IEEE, printed Aug. 13, 2015, pp. 148-155, DOI 10.1109/CLOUD.2010.60.

* cited by examiner

*Primary Examiner* — Rocio Del Mar Perez-Velez
(74) *Attorney, Agent, or Firm* — Adolph C. Bohnstedt; Arnold B. Bangali (57) ABSTRACT

One or more processors migrate an amount of cloud data from a non-volatile memory to a volatile cache memory. One or more processors partition the amount of cloud data into a plurality of objects of a size that allow for a satisfactory read/write throughput performance. One or more processors analyze the plurality of objects for input/output performance over a time period. One or more processors migrate a first portion of the plurality of objects back to the non-volatile memory, wherein the first portion of the plurality of objects exhibit a first input/output performance lower than a first threshold value.

20 Claims, 5 Drawing Sheets

DYNAMIC MODULATION OF CACHE MEMORY

BACKGROUND OF THE INVENTION

The present invention relates generally to the field of cloud computing, and more particularly to modulating cloud cache memory efficiently.

Input/output (I/O) performance is a growing challenge in cloud computing. I/O performance is typically measured as input/output operations per second (IOPS). One way IOPS is improved is to retain computed data on easily accessible memory. Recently, IOPS have been improved by the use of faster storage media such as solid state disks (SSDs).

SUMMARY

Embodiments of the present invention provide a method, system, and program product to dynamically modulate cloud cache memory. One or more processors migrate an amount of cloud data from a non-volatile memory to a volatile cache memory. One or more processors partition the amount of cloud data into a plurality of objects of a size that allow for a satisfactory read/write throughput performance. One or more processors analyze the plurality of objects for input/output performance over a time period. One or more processors migrate a first portion of the plurality of objects back to the non-volatile memory, wherein the first portion of the plurality of objects exhibit a first input/output performance lower than a first threshold value.

DETAILED DESCRIPTION

The growth of cloud computing has led to challenges with respect to cloud Input/Output (I/O) performance. Traditionally, the amount of cache memory in cloud computing systems limits the amount of quickly accessible data available to clients, which directly impacts I/O performance. One way this challenge has been met is through the expansion of cloud cache using non-volatile flash storage (i.e., SSD cache), which is expensive.

The need for data in cache memory is directly proportional to the number of times the data is accessed. Heavily accessed data is often referred to as "hot" data while data that is accessed rarely is referred to as "cold" data. As would be expected there is a continuum of data temperatures between "hot" and "cold." When cache memory is limited, then useful data that is not "hot" enough is relegated to slower-to-access non-volatile storage media such as hard drive disks (HDDs). Thus, cache memory that can be modulated to accommodate all data that is "hotter" than a specified threshold temperature is particularly useful in an I/O-intensive cloud computing environment.

Embodiments of the present invention recognize that cloud I/O performance relies on cache memory. Embodiments of the present invention recognize that solutions for increasing cache memory in cloud systems have involved the use of expensive non-volatile storage media such as SSDs. Embodiments of the present invention provide a method, computer program product, and computer system that can modulate the ability of volatile cloud cache memory to accommodate varying amounts of highly used data.

The present invention will now be described in detail with reference to the Figures.

Figure 1:
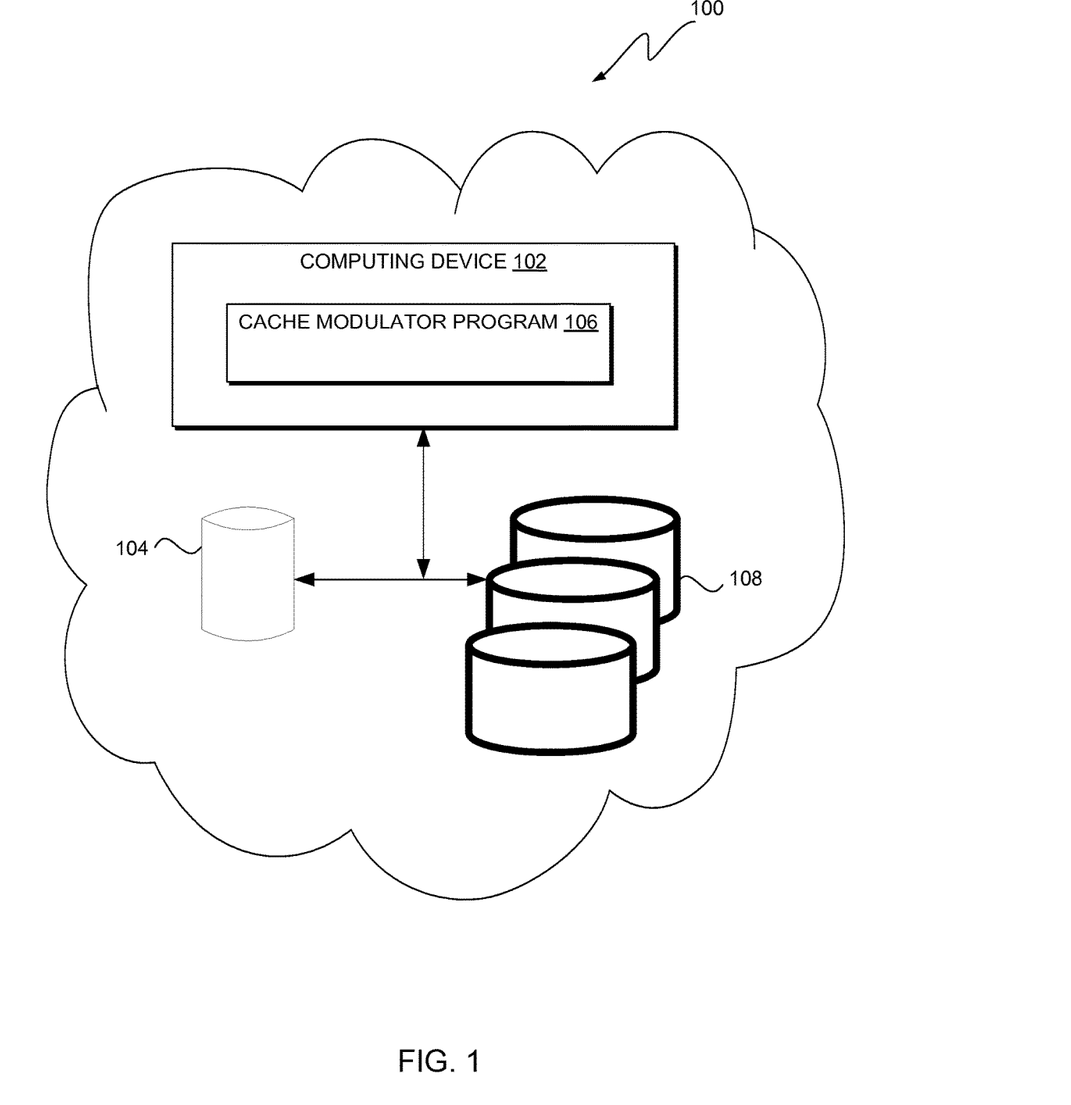
FIG. 1 is a functional block diagram illustrating a multi-tiered storage-based cloud computing environment, in accordance with an exemplary embodiment of the present invention.

FIG. 1 is a functional block diagram illustrating a multi-tiered storage-based cloud computing environment, generally designated 100, in accordance with one embodiment of the present invention. Multi-tiered storage-based cloud computing environment 100 includes computing device 102, volatile cache memory 104, and non-volatile storage 108. Computing device 102 includes cache modulator program 106.

In various embodiments of the present invention, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to cache modulator program 106, volatile cache memory 104, and non-volatile storage 108 and is capable of executing cache modulator program 106. Computing device 102 may include internal and external hardware components, as depicted and described in further detail with respect to FIG. 5.

In this exemplary embodiment, cache modulator program 106 is stored on computing device 102. However, in other embodiments, cache modulator program 106 may be stored externally and accessed through a communication network, such as the network included in multi-tiered storage-based cloud computing environment 100. A network included in multi-tiered storage-based cloud computing environment 100 can be, for example, a local area network (LAN), a wide area network (WAN) such as the Internet, or a combination of the two, and may include wired, wireless, fiber optic or any other connection known in the art. In general, a network included in multi-tiered storage-based cloud computing environment 100 can be any combination of connections and protocols that will support communications between computing device 102, volatile cache memory 104, non-volatile storage 108, and cache modulator program 106, in accordance with a desired embodiment of the present invention.

In exemplary embodiments, cache modulator program 106 modulates the performance of volatile cache memory 104 in cloud computing environment 100. In general, cache modulator program 106 analyzes the I/O activity of data within volatile cache memory 104 and removes data that has an I/O activity lower than a threshold value. Cache modulator program 106 migrates the removed data that has the I/O activity lower than the threshold value into non-volatile storage 108.

In exemplary embodiments, volatile cache memory 104 is volatile memory in multi-tiered storage-based cloud computing environment 100 that provides access to high I/O activity data at a rate of input/output operations per second (IOPS) that satisfies a cloud provider service-level agreement (SLA).

In exemplary embodiments, non-volatile storage 108 is long-term non-volatile data storage media, for example non-volatile memory, within multi-tiered storage-based cloud computing environment 100 that stores data with an I/O activity lower than the threshold value. Examples of non-volatile storage 108 include, but are not limited to, magnetic storage media (e.g., hard disk drives (HDDs), tape cartridges, etc.), optical media (e.g., compact disks (CDs), digital video disks (DVDs), etc.), and flash memory (e.g., SSDs, universal serial bus (USB) drives, memory cards, etc.). Note that those skilled in the art appreciate the differences between volatile memory and non-volatile memory. In general non-volatile memory, is computer memory that can retrieve stored information even after having been power cycled (turned off and back on). In contrast, volatile memory is computer memory that requires power to maintain the stored information. In other words, volatile memory retains its contents (i.e., the data being stored by the volatile memory) while powered on but if the power is interrupted, then the stored data rapidly degrades, i.e., is lost. In general, cache memory is a component that stores data so future requests for that data are served faster. The data stored in a cache memory might be the result of an earlier computation, or the duplicate of data stored elsewhere. A cache-hit occurs when the requested data is found in a cache memory, while a cache-miss occurs when the requested data is not found in the cache memory. Cache-hits are served by reading data from the cache memory, which is often significantly faster than re-computing that data, for example a result, or retrieving that data from a slower data store like non-volatile memory. Thus, the more requests that can be served from the cache, the faster a computing system typically performs. As such, the differences between volatile cache memory 104 and non-volatile storage 108 are clear to those skilled in the art.

Figure 2:
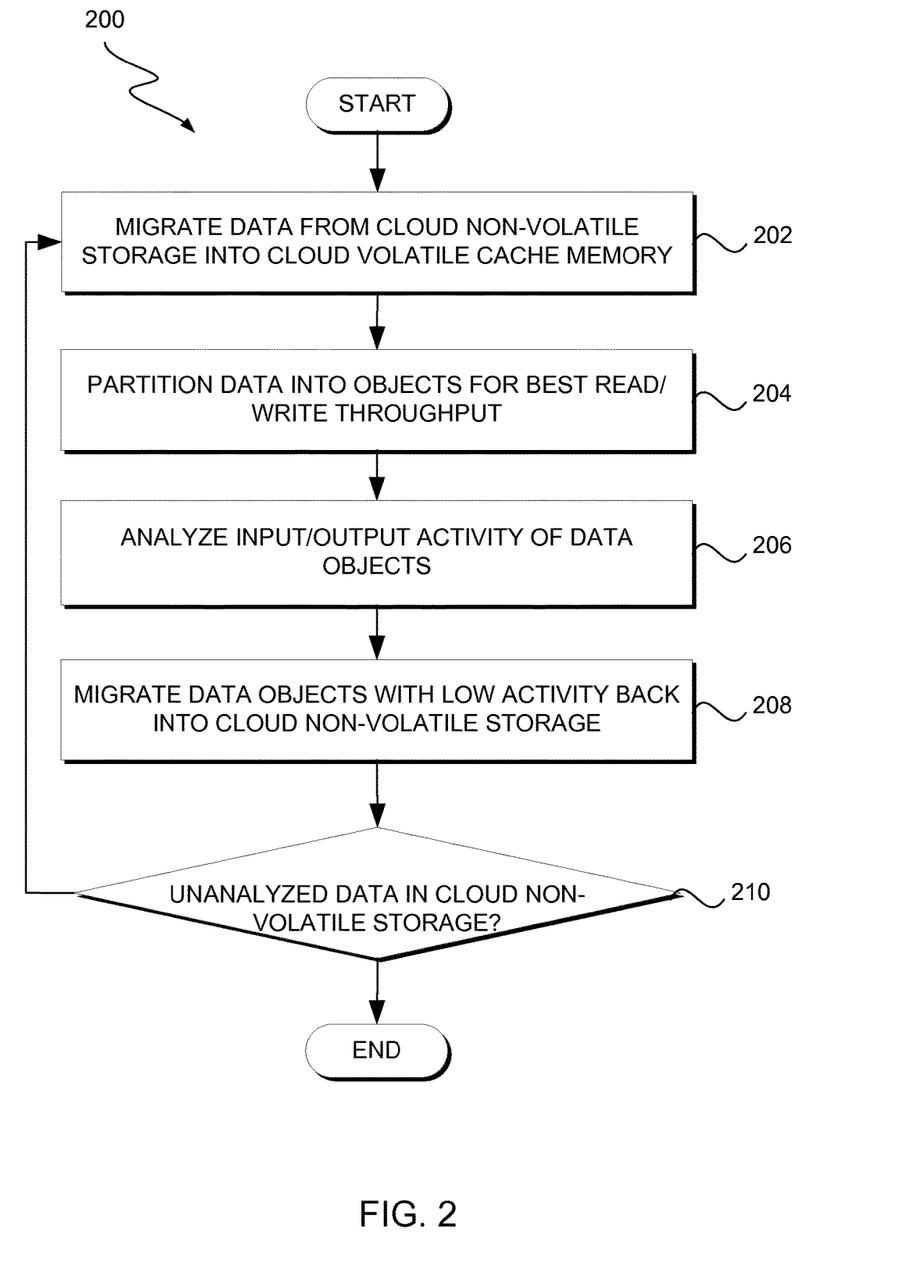
FIG. 2 illustrates operational processes for modulating computing cache memory size in a multi-tier storage-based cloud computing environment, on a computing device within the environment of FIG. 1, in accordance with an exemplary embodiment of the present invention.

FIG. 2 illustrates operational processes, generally designated 200, for modulating the presence of low I/O activity data within volatile cache memory 104 in multi-tier storage-based cloud computing environment 100, on computing device 102, in accordance with an exemplary embodiment of the present invention.

In step 202, cache modulator program 106 migrates data from non-volatile storage 108 into volatile cache memory 104. In various embodiments, the amount of data that is migrated into volatile cache memory 104 depends on the amount of available volatile cache memory 104 that can be used while still maintaining cloud performance in line with current SLA criteria. In various embodiments, data in volatile cache memory 104 that has been analyzed and shown to have low I/O activity, i.e., below a threshold, is migrated to non-volatile storage 108 in order to accommodate the migration of unanalyzed data from non-volatile storage 108 to volatile cache memory 104.

In step 204, cache modulator program 106 partitions the migrated data in volatile cache memory 104 into objects that allow for the best read/write throughput performance. In various embodiments, the read/write throughput is measured in units of megabytes per second (MB/s) and the data is partitioned into objects varying from 256 kilobytes (256 kB) to 10 megabytes (10 MB). In an example, the data migrated from non-volatile storage 108 into volatile cache memory 104 is partitioned by cache modulator program 106 into object sizes of 256 kB, 1 MB, and 10 MB with thread counts of four and eight for each size. In one experiment to determine read/write throughput, it was found that the 1 MB object size performs best when the thread count is equal to eight by displaying a write throughput of 96 MB/s and a read throughput of 100 MB/s. In one embodiment, based on that result, cache modulator program 106 partitions the migrated data into 1 MB objects for optimal I/O performance. One skilled in the art recognizes that the partitioning of the migrated data can vary in some embodiments. Further, in some embodiments, one skilled in the art recognizes that the partitioning of the migrated data can be based, at least in part, on a particular scenario and the available resources of cloud computing environment 100.

In step 206, cache modulator program 106 analyzes the I/O activity of the partitioned data objects. In various embodiments, cache modulator program 106 determines the IOPS over a period of time for data stored on volatile cache memory 104. Depending on the IOPS determined over the period of time for the data stored on volatile cache memory 104, cache modulator program 106 determines whether the data is accessed with a frequency higher or lower than a threshold frequency. In various embodiments, data that is accessed with a frequency higher than the threshold value is data that is considered "hot" and will be retained in volatile cache memory 104 by cache modulator program 106. In these embodiments, data that is accessed with a frequency lower than the threshold value is data that is considered "cold" and will be migrated to non-volatile storage 108 by cache modulator program 106 in step 208.

In various embodiments, the periods of time chosen for determining the IOPS of the data stored on volatile cache memory 104 includes, but is not limited to, one or more of: day-, week-, month-, quarter-, season-, and year-length periods of time. In some embodiments, the overall IOPS are determined for the analyzed data along with a statistical analysis that identifies, for example, when periods of high activity occur during the time period and when periods of low activity occur during the time period. For example, an analysis of IOPS activity by cache modulator program 106 for data in a day-length period of time determines that there is significantly more I/O activity during daytime hours than during nighttime hours. In another example, an analysis of IOPS activity by cache modulator program 106 for data in a week-length period of time determines that there is significantly more I/O activity during weekdays than during weekends. In a third example, an analysis of IOPS activity by cache modulator program 106 for data in a quarter-length period of time determines that there is significantly more I/O activity during the end of the quarter compared to the beginning of the quarter.

In various embodiments, cache modulator program 106 determines that different types of data exhibit higher I/O activity during certain times. For example, the analysis of data from a bank shows that there is much more I/O activity for transaction processing data during banking hours. However, during the period of time that the bank is closed, report-generating data shows a significant jump in I/O activity.

In step 208, cache modulator program 106 migrates data with I/O activity of a lower frequency than the threshold value into non-volatile storage 108. In various embodiments, data with an I/O activity that falls below a second threshold value is deleted by cache modulator program 106 if the storage space in non-volatile storage 108 falls below a third threshold value. In these embodiments, the second threshold value for deletion is a lower value than the threshold value for migration, i.e., the I/O activity criteria for data that is deleted by cache modulator program 106 is lower than the I/O activity criteria for data that is migrated.

In various embodiments, cache modulator program 106 migrates some data from volatile cache memory 104 into non-volatile storage 108 on a temporary basis when the analysis in step 204 indicates that the data will have high I/O activity at a distant future date. As the date approaches, cache modulator program 106 retrieves the data from non-volatile storage 108 and restores it into volatile cache memory 104. For example, analysis of a data I/O activity by cache modulator program 106 indicates that the data has high I/O activity only during the last two weeks of every quarter. Cache modulator program 106 stores the data in non-volatile storage 108 for all of the weeks during the quarter when the data will be seldom accessed and restores it to volatile cache memory 104 during the final two weeks of the quarter.

In decision step 210, cache modulator program 106 determines whether there is unanalyzed data in non-volatile storage 108, i.e., data that cache modulator program 106 has not analyzed for I/O activity while in volatile cache memory 104. In some embodiments, if data has not been analyzed within a time period, i.e., in excess of a threshold, then cache modulator 106 determines that the data has not been analyzed and migrates that data to volatile cache memory 104 for analysis. In some scenarios, a portion of volatile cache memory 104 is partitioned for use by cache modulator 106 to migrate non-analyzed data from non-volatile storage 108 to volatile cache memory 104. Cache modulator 106 then analyzes the migrated data from non-volatile storage 108 and processes it based on the result of that analysis, as described herein. In various embodiments, data objects that are analyzed in this process are flagged as analyzed by cache modulator program 106 before being migrated to non-volatile storage 108. If cache modulator program 106 determines that there is unanalyzed data in non-volatile, then cache modulator program 106 goes to step 202. In some embodiments, the process, encompassed by steps 202-210, is repeated until all of the data in non-volatile storage 108 has been analyzed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
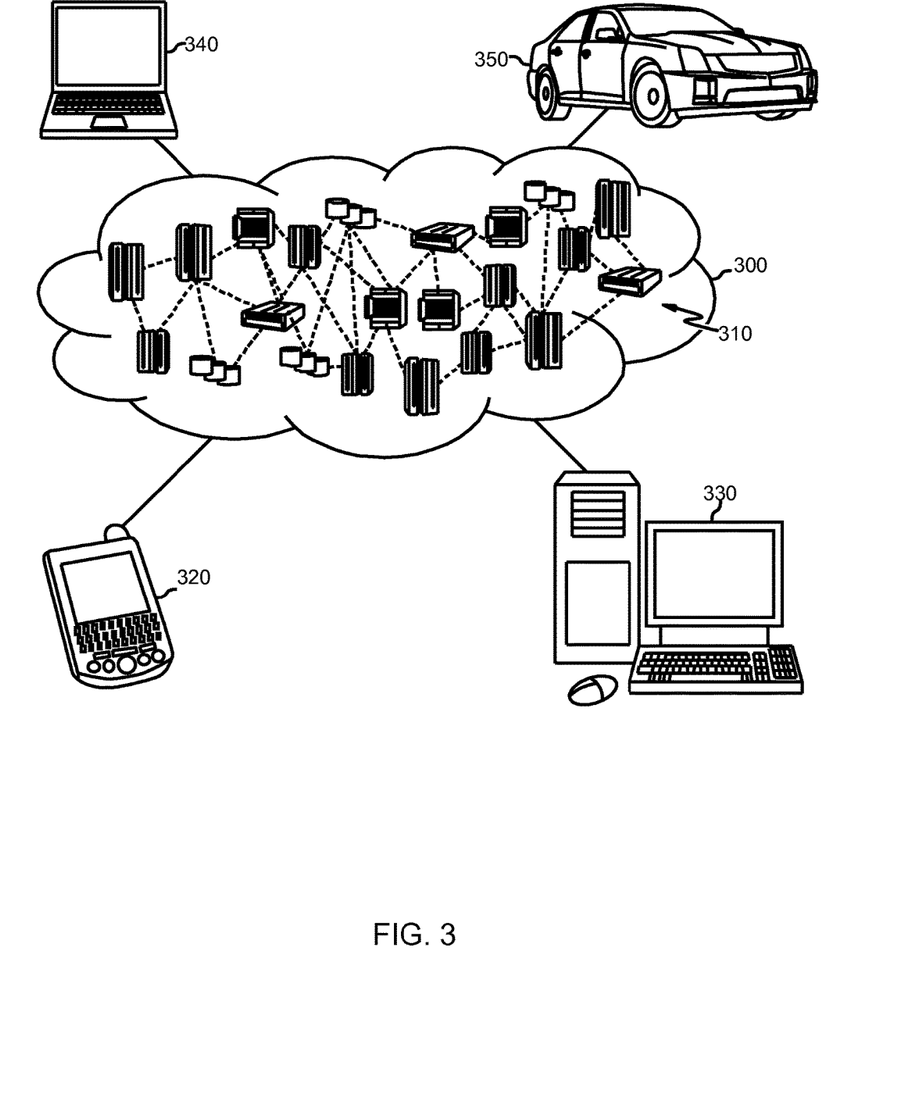
FIG. 3 depicts a cloud computing environment according to an embodiment of the present invention.

Referring now to FIG. 3, illustrative cloud computing environment 300 is depicted. As shown, cloud computing environment 300 comprises one or more cloud computing nodes 310 with which local computing devices used by cloud consumers, such as, for example, personal digital assistant (PDA) or cellular telephone 320, desktop computer 330, laptop computer 340, and/or automobile computer system 350 may communicate. Nodes 310 may communicate with one another. Nodes 310 may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 320, 330, 340, and 350 shown in FIG. 1 are intended to be illustrative only and that computing nodes 310 and cloud computing environment 300 can communicate with any type of computerized device over any type of network and/or network addressable connection (e.g., using a web browser).

Figure 4:
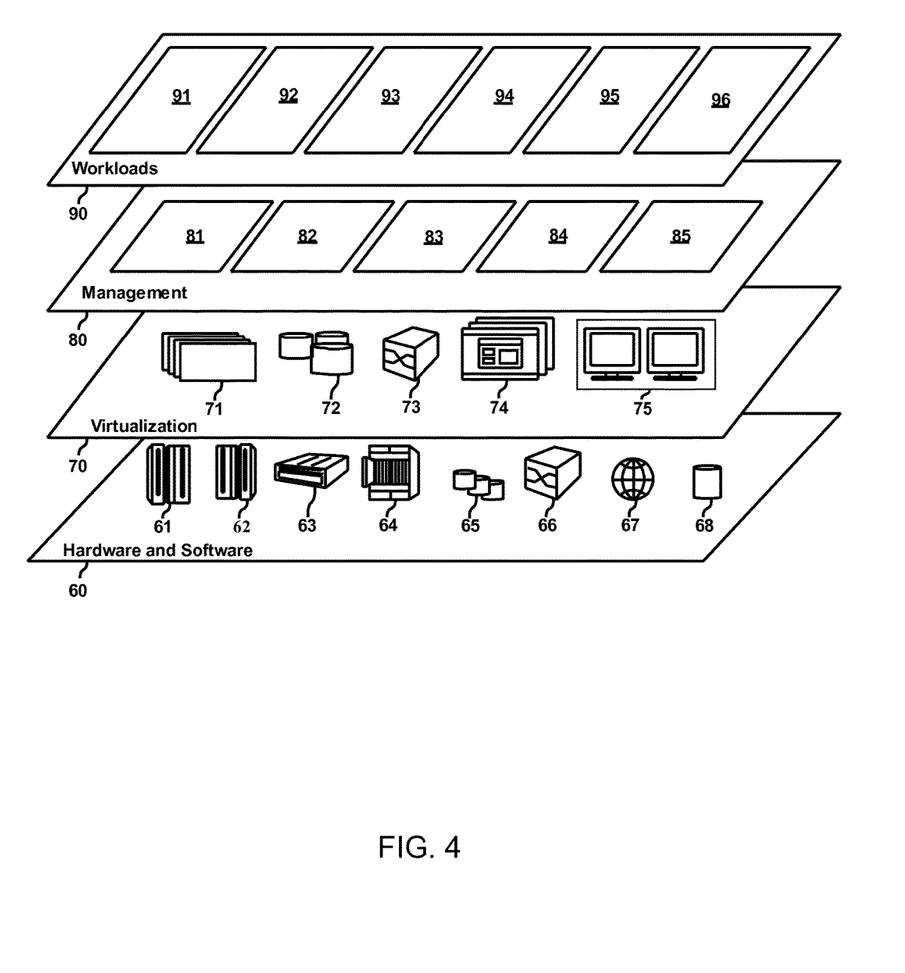
FIG. 4 depicts abstraction model layers according to an embodiment of the present invention.

Referring now to FIG. 4, a set of functional abstraction layers provided by cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources (such as cache memory modulation) and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 5:
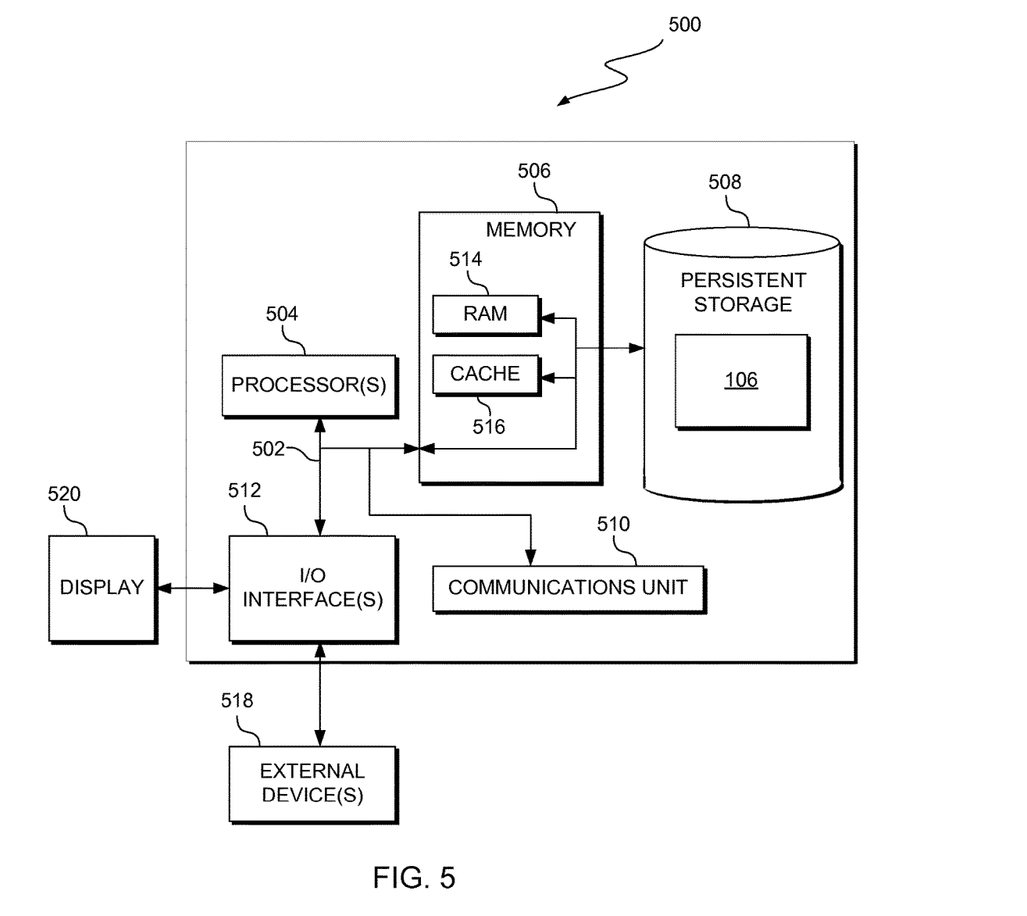
FIG. 5 depicts a block diagram of components of the computing device executing a cache modulator program, in accordance with an exemplary embodiment of the present invention.

FIG. 5 depicts a block diagram, 500, of components of computing device 102, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Cache modulator program 106 is stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of multi-tiered storage-based cloud computing environment 100. In these examples, communications unit 510 includes one or more network interface cards. Communications unit 510 may provide communications through the use of either or both physical and wireless communications links. Cache modulator program 106 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., cache modulator program 106, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method comprising:
    migrating, by one or more processors, an amount of cloud data from a non-volatile memory to a volatile cache memory;
    partitioning, by the one or more processors, the amount of cloud data into a plurality of objects of a size that ranges from 256 kilobytes to 10 megabytes;
    analyzing, by the one or more processors, the plurality of objects for input/output performance over a time period;
    migrating, by the one or more processors, a first portion of the plurality of objects back to the non-volatile memory, wherein the first portion of the plurality of objects exhibit a first input/output performance lower than a first threshold value, wherein the first portion of the plurality of objects that exhibits the first input/output performance lower than the first threshold value is migrated back to the non-volatile memory to accommodate migration of unanalyzed cloud data from the non-volatile memory to the volatile cache memory;
    determining, by the one or more processors, if there is unanalyzed cloud data in the non-volatile memory, wherein the unanalyzed cloud data is cloud data that has not been analyzed for input/output performance while in volatile cache memory; and
    in response to determining that there is unanalyzed cloud data in the non-volatile memory, migrating the unanalyzed cloud data to the volatile cache memory for analysis.

2. The method of claim 1 further comprising:
    based, at least in part, on a predicted time of increase in a second input/output activity for a second portion of the plurality of objects, migrating, by the one or more processors, the second portion of the plurality of objects from the non-volatile memory into the volatile cache memory at a time before the predicted time of increase in the second input/output activity.

3. The method of claim 1, wherein the time period includes one or more of: day-, week-, month-, quarter-, season-, and year-length time periods.

4. The method of claim 1, wherein the non-volatile memory includes one or more of: hard drive disks, tape cartridges, compact disks, digital video disks, solid state disks, universal serial bus drives, and memory cards.

5. The method of claim 1, wherein a size of the plurality of objects includes one or more of: 256 kilobytes, one megabyte, and ten megabytes.

6. The method of claim 1 further comprising:
    deleting, by the one or more processors, a third portion of the plurality of objects based, at least in part, on a third input/output performance lower than a second threshold value.

7. The method of claim 6, wherein the second threshold value is lower than the first threshold value.

8. A computer program product comprising:
    one or more computer-readable storage media and program instructions stored on at least one of the one or more computer-readable storage media, the program instructions comprising:
        program instructions to migrate an amount of cloud data from a non-volatile memory to a volatile cache memory;
        program instructions to partition the amount of cloud data into a plurality of objects of a size that ranges from 256 kilobytes to 10 megabytes;
        program instructions to analyze the plurality of objects for input/output performance over a time period;
        program instructions to migrate a first portion of the plurality of objects back to the non-volatile memory, wherein the first portion of the plurality of objects exhibit a first input/output performance lower than a first threshold value, wherein the first portion of the plurality of objects that exhibits the first input/output performance lower than the first threshold value is migrated back to the non-volatile memory to accommodate migration of unanalyzed cloud data from the non-volatile memory to the volatile cache memory;
        program instructions to determine if there is unanalyzed cloud data in the non-volatile memory, wherein the unanalyzed cloud data is cloud data that has not been analyzed for input/output performance while in volatile cache memory; and
        in response to determining that there is unanalyzed cloud data in the non-volatile memory, program instructions to migrate the unanalyzed cloud data to the volatile cache memory for analysis.

9. The computer program product of claim 8 further comprising:
    based, at least in part, on a predicted time of increase in a second input/output activity for a second portion of the plurality of objects, program instructions to migrate the second portion of the plurality of objects from the non-volatile memory into the volatile cache memory at a time before the predicted time of increase in the second input/output activity.

10. The computer program product of claim 8, wherein the time period includes one or more of: day-, week-, month-, quarter-, season-, and year-length time periods.

11. The computer program product of claim 8, wherein the non-volatile memory includes one or more of: hard drive disks, tape cartridges, compact disks, digital video disks, solid state disks, universal serial bus drives, and memory cards.

12. The computer program product of claim 8, wherein a size of the plurality of objects includes one or more of: 256 kilobytes, one megabyte, and ten megabytes.

13. The computer program product of claim 8 further comprising:

program instructions to delete a third portion of the plurality of objects based, at least in part, on a third input/output performance lower than a second threshold value.

14. The computer program product of claim 13, wherein the second threshold value is lower than the first threshold value.

15. A computer system comprising:
one or more computer processors;
one or more computer-readable storage media; and
program instructions to migrate an amount of cloud data from a non-volatile memory to a volatile cache memory;
program instructions to partition the amount of cloud data into a plurality of objects of a size that ranges from 256 kilobytes to 10 megabytes;
program instructions to analyze the plurality of objects for input/output performance over a time period;
program instructions to migrate a first portion of the plurality of objects back to the non-volatile memory, wherein the first portion of the plurality of objects exhibit a first input/output performance lower than a first threshold value, wherein the first portion of the plurality of objects that exhibits the first input/output performance lower than the first threshold value is migrated back to the non-volatile memory to accommodate migration of unanalyzed cloud data from the non-volatile memory to the volatile cache memory;
program instructions to determine if there is unanalyzed cloud data in the non-volatile memory, wherein the unanalyzed cloud data is cloud data that has not been analyzed for input/output performance while in volatile cache memory; and
in response to determining that there is unanalyzed cloud data in the non-volatile memory, program instructions to migrate the unanalyzed cloud data to the volatile cache memory for analysis.

16. The computer system of claim 15 further comprising:
based, at least in part, on a predicted time of increase in a second input/output activity for a second portion of the plurality of objects, program instructions to migrate the second portion of the plurality of objects from the non-volatile memory into the volatile cache memory at a time before the predicted time of increase in the second input/output activity.

17. The computer system of claim 15, wherein the time period includes one or more of: day-, week-, month-, quarter-, season-, and year-length time periods.

18. The computer system of claim 15, wherein the non-volatile memory includes one or more of: hard drive disks, tape cartridges, compact disks, digital video disks, solid state disks, universal serial bus drives, and memory cards.

19. The computer system of claim 15, wherein a size of the plurality of objects includes one or more of: 256 kilobytes, one megabyte, and ten megabytes.

20. The computer system of claim 15 further comprising:
program instructions to delete a third portion of the plurality of objects based, at least in part, on a third input/output performance lower than a second threshold value.

* * * * *